Figure 3:
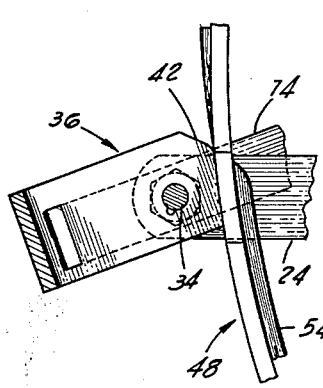

Dec. 4, 1962 E. T. CLINTON ET AL 3,066,764
CASTER BRAKE AND LOCK
Filed Nov. 19, 1959 2 Sheets-Sheet 1

INVENTORS
EDWIN T. CLINTON
MICHAEL KRAMCSAK JR.

By *A. J. Douvas*

ATTORNEY

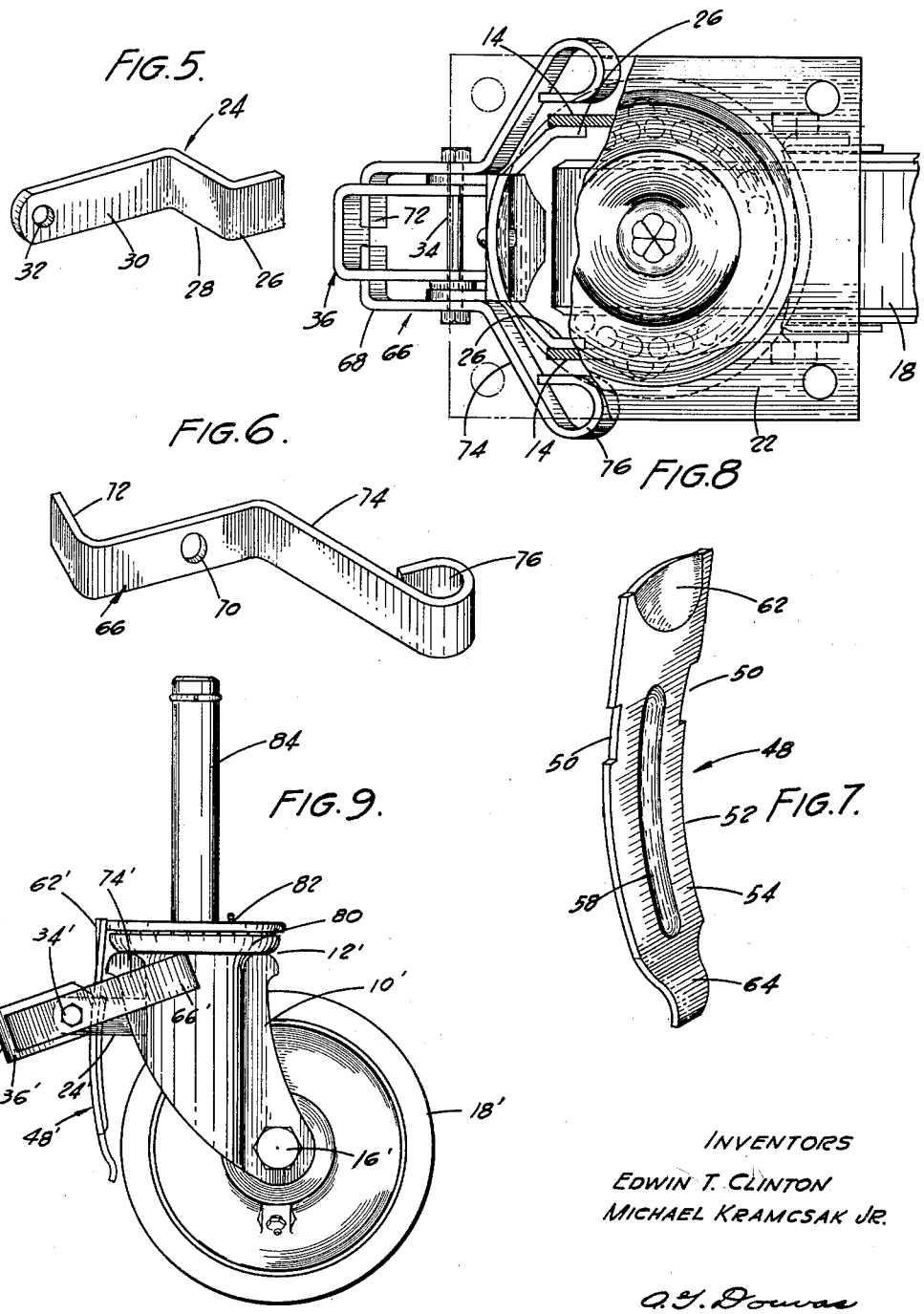

3,066,764
CASTER BRAKE AND LOCK
Edwin T. Clinton, Redding Ridge, and Michael Kramcsak, Jr., Bridgeport, Conn., assignors to The Bassick Company, Bridgeport, Conn., a corporation of Connecticut
Filed Nov. 19, 1959, Ser. No. 854,095
6 Claims. (Cl. 188—74)

This invention relates to brake-equipped casters and more particularly to a structure of the general type disclosed in United States Letters Patent 2,707,794 to Kramcsak, dated May 10, 1955 and assigned to the common assignee. The patent discloses a caster structure including a horn supporting a wheel for rotation therein. The caster includes a top plate supported on anti-friction bearings which are interposed between the top plate and the horn allowing the top plate to be rotatable. Rigidly fixed to the top plate is an upstanding pintle for engagement with the object to be supported. The caster is further provided with a rearwardly extending support at the upper portion of the horn upon which is supported, for movement in a generally forward and rearward direction, a resilient brake shoe. The upper end of the shoe is adapted to engage and brake the top plate while the lower end of the shoe is engageable for braking purposes with the periphery of the caster wheel. The rearwardly projecting support is provided with a transverse pivot pin on which is pivotably mounted a cam member having forwardly disposed camming legs that are adapted to engage the rear surface of the shoe for the purpose of shifting the shoe forwardly into the braking position.

Since the cam member includes a single rearwardly directed handle, of necessity, such a structure requires the operator to exert a downward pressure on the single element handle to effect a locking or braking operation while an upward force must be directed along the lower surface of the handle to effect disengagement of the brake or locking means. Devices of this type require operating means for rotating the cam which extends quite a distance away from the caster structure proper and may easily snag articles or persons moving within the vicinity of the caster structure.

Since casters are normally positioned a few inches off the floor, the locking means associated with such structures have usually been operated by force exerted through the foot of the persons performing the locking operation. Where the brake equipped casters make use of a cam in which the cam lever is adapted to move in one direction to effect the locking operation and in an opposite direction to effect an unlocking operation, the operator is normally required to bend down and effect an upward movement of the cam lever to lock or unlock the brake, rather than making use of a downwardly directed force to both lock and unlock the apparatus.

It is therefore an object of this invention to provide an improved arrangement for locking and unlocking a caster wheel or a dual wheel and swivel friction brake which requires a minimum number of parts.

It is a further object of this invention to provide an improved locking arrangement for locking and unlocking a caster wheel or dual wheel and swivel friction brake which requires a downward pressure to both lock and unlock the friction brake element.

It is a further object of this invention to provide an improved arrangement for locking and unlocking a caster wheel or a dual caster wheel and swivel friction brake in which the elements making up the locking means do not extend any great distance from the normal caster structure elements.

Other objects of this invention will be pointed out in the following detailed description and claims and illustrated in the accompanying drawings which disclose, by way of example, the principle of this invention and the best mode which has been contemplated of applying that principle.

Figure 1:
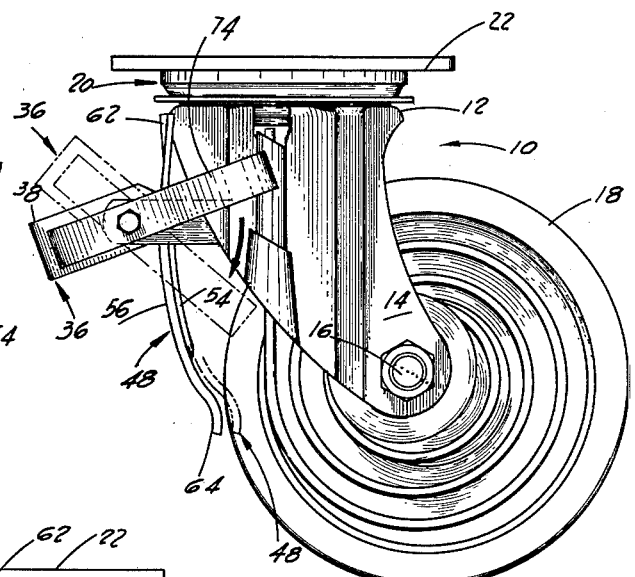
Figure 2:
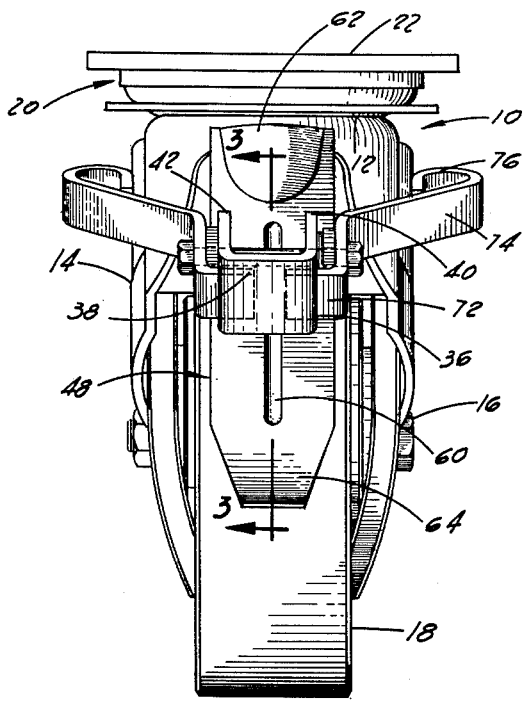
Figure 4:
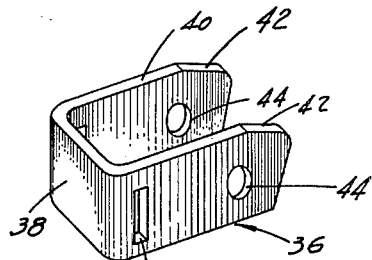

In the drawings:
FIG. 1 is a side elevational view of a caster structure employing the present invention.
FIG. 2 is a rear elevational view of the structure shown in FIG. 1.
FIG. 3 is a sectional view of a portion of the apparatus shown in FIG. 1 taken along lines 3—3 of FIG. 2.
FIG. 4 is a perspective view of the brake cam forming a portion of the apparatus shown in FIGS. 1 and 2.
FIG. 5 is a perspective view of the brake cam bracket forming a portion of the apparatus shown in FIGS. 1 and 2.
FIG. 6 is a perspective view of the brake lever forming a portion of the apparatus shown in FIGS. 1 and 2.
FIG. 7 is a perspective view of the brake shoe forming a portion of the apparatus shown in FIGS. 1 and 2.
FIG. 8 is a top plan view, partially in section, of the apparatus shown in FIGS. 1 and 2.
FIG. 9 is a side elevational view of another embodiment of the present invention.

In general, the apparatus of this invention includes a caster horn having a caster wheel supported for rotation therein with the caster horn including a support projecting rearwardly from the upper part of the horn and a brake shoe mounted for movement in the support toward and away from the wheel periphery and having extremities respectively engageable with a portion of the horn and the periphery of the wheel to frictionally lock the wheel when the brake shoe is moved to the engaged position. The shoe is of resilient material and is elongated in a vertical direction and bowed slightly such that its concave face is directed toward the caster wheel and a pivotable cam is mounted in the support for engaging the convex surface of the shoe to move the shoe into the engaged position. The pivotable cam includes a first upward contact surface which extends rearwardly away from the pivot point of the cam and a second upward contact surface extending forwardly away from said pivot point whereby a downwardly directed force may alternately be directed against the first contact surface to unlock the brake shoe and against the second contact surface to lock the brake shoe against the periphery of the wheel.

Referring now to the drawings, there is shown in FIGS. 1, 2 and 8, one embodiment of the present invention which comprises a caster structure including a conventional horn 10 which is formed of sheet metal or the like and includes a generally flattened upper portion 12 and a pair of downwardly directed, spaced, generally parallel, side portions 14. A laterally extending axle is positioned within suitable apertures formed within the horn side portions 14 and acts to support a caster wheel 18 for rotation within the horn 10. The caster structure of this embodiment and the embodiment shown in FIG. 9 is in general quite similar to the caster structure fully described in United States Letters Patent 2,721,766 to M. Kramscak, Jr. issuing October 25, 1955. The caster structure further includes an anti-friction bearing which is generally indicated at 20 and is positioned between the upper portion of the caster horn 12 and a mounting plate 22, allowing the caster to be attached to a device (not shown) which it is acting to support. The anti-friction bearing therefore allows the horn 10 to rotate with respect to the mounting plate 22 about a generally vertical axis.

The present invention is directed to a simplified arrangement for effecting a braking or locking action of the caster wheel by causing a laterally moving, resilient brake shoe to engage a portion of the caster horn and the periphery of the caster wheel by pivotally moving a cam member associated with the brake shoe. In this regard, a pair of brake cam bracket members 24, FIG. 5, which may be made of rectangular sheet metal stock are rigidly secured to the outer ends of the caster horn side portions 14. As indicated in FIG. 8, the inner ends 26 of the brake cam bracket member 24 are rigidly secured to the inner surfaces of the horn side portions 14 at a point intermediate of the axle 16 and the horn base or upper flattened portions 12 of horn 10, with the bracket member extending along a horizontal plane generally parallel to the plane of the base portion 12 of the horn. As indicated in FIG. 5, the brake cam bracket member 24 is formed with the member bent inwardly at 28 for a slight distance with remaining or outer end 30 of the brake cam bracket member 24 being again directed along a plane parallel to the plane of the inner edge portion 26. The outer end 30 includes a small central aperture 32 just rearward of the forward edge. As indicated in FIG. 8, the brackets are so mounted that their outer ends are directed toward each other and because of the intermediate or bent portions 28, the lateral distance between the outer ends 30 is considerably less than the lateral distance between the inner ends when the bracket members are mounted on the horn structure. The apertures 32 are aligned so that pivot pin 34 may be positioned within the apertures and extend therethrough to provide a pivot mounting structure for a generally U-shaped brake cam member 36. The brake cam member 36, FIG. 4, is of generally U-shaped configuration including a base portion 38 and a pair of generally parallel arm portions 40 with the arm portions being provided with suitable cam surfaces 42 formed along the outer extremities thereof. Suitable aligned slots 44 are formed within each of the arms and the position of these slots, along with the particular configuration given to the cam surfaces 42, act to effect a particular longitudinal movement to the brake shoe member. The brake cam member 36 is pivotally mounted on the pin 34 with the arms 40 of the brake cam member being positioned within the brake cam bracket member 24 with the cam surface directed toward the caster wheel. A pair of aligned generally vertically extending slots 46 are also formed within the arms 40 of the U-shaped brake cam member for purposes which will be fully disclosed later. In order to resiliently lock the caster wheel 18 against rotation within horn 10, there is provided a single element brake shoe 48, FIG. 7, which is formed of springy sheet metal of substantial thickness and is adapted to be suitably mounted on the brake cam bracket members 24 by means of a pair of notches 50 formed within the sides 52 of the brake shoe. The notches 50 allow the shoe to slide along the bracket members 24 and at the same time allow tilting to some extent with respect to the bracket member. The brake shoe 48 in longitudinal section is slightly bowed, or curved on a relatively long radius, the concave portion 54 facing forward so that the action of cam member 36 will be upon the convex face 56. In order to strengthen the shoe and inhibit any tendency of its taking a permanent set under the action of the cam, the shoe is provided with a longitudinal rib or protuberance 58, the rib being formed by displacement of a metal in a forward direction thereby creating a corresponding groove 60 at the rear face of the shoe. Since the cam surfaces 42 engage only a portion of the rear surface of the brake shoe, the width of the rib 58 may be varied, but it is only necessary to have a relatively narrow rib to give sufficient strength to the brake shoe to resist flattening somewhat when the cam member moves the brake into locking engagement with the periphery of the caster wheel. The upper extremities of the brake shoe are provided with a generally scalloped portion 62 which is provided to insure surface contact between the upper extremities of the brake shoe member and the upper rear portions of the shoe 10 in the embodiment shown in FIG. 1. The lower end of the brake shoe terminates in a portion which is bent outwardly to effect a generally rounded surface 64 contacting the periphery of the wheel to effect a locking or braking action when the cam member 36 engages the convex surface 56 of brake shoe 48. The manner in which the brake shoe 48 is loosely positioned within the two brake cam bracket members 24 and the manner in which the cam surface 42 contacts convex surface 56 of the brake shoe, may be seen best, by reference to FIG. 3. Because of the offset position of the apertures 44 formed within the cam member 36, as well as the particular configuration given to the cam surfaces 42, it is easily seen that the mere rotation of the cam member 36 with respect to the pivot pin 34 causes the cam surface 42 to force the shoe 48 laterally relative to the bracket member 34 to cause the frictional contact surface 64 to engage the periphery of wheel 18 while at the same time the scalloped portion 62 of the brake shoe is in frictional engagement with the upper rear surface of horn 10. The rotational movement imparted to the cam member 36 to effect a locking and unlocking of the brake shoe with respect to the caster wheel may be appreciated by references to FIG. 1 which shows the braking elements in unlocked position as indicated by the elements being in the full line position, whereas the dotted line position of the cam member 36 and the lower portion of the brake shoe 48 indicates the position of said elements in the locked or braked position. From FIG. 3, it is apparent that the combination of the position of the pivot point and the configuration of the cam surfaces of the U-shaped cam member result in an over center action being imparted to the cam member. Inherently, the cam member will remain in either the locking or unlocking position unless outside force is utilized to effect a change. While it is only necessary to rotate the brake cam member 36 in either an upward or downward direction at the rear thereof to effect locking and unlocking of the brake shoe, the present invention is directed to a structure requiring only a downwardly directed force to achieve both locking and unlocking of the braking member. In order to achieve this end, there is provided a pair of brake lever members 66, FIG. 6, formed of generally rectangular metal strip stock, which are adapted to be mounted adjacent the cam member 36 and to move therewith. The lever members 66 are bent or otherwise formed so as to be provided with a central section 68 including a suitable aperture 70 of the diameter slightly in excess of the diameter of pivot pin 34. At the rear of the central portion 68, the member 66 is bent inwardly as at 72 and is of a thickness and height just slightly less than the vertical and horizontal dimensions of slot 46, FIG. 4, formed within the arms 40 of the U-shaped cam member. It is obvious therefore that as the lever members 66 are assembled on the cam member, the inwardly directed portion 72 is positioned within the slot 46 while the pivot pin 34 passes through aperture 70. In order to provide an effective contact surface on the lever, there is provided an extension portion 74 at the forward end of the lever 66 which is bent generally outwardly and forwardly so as to extend close to the rounded side 14 of the caster horn 10 when assembled. The extension portion 74 may terminate in a reverse band as at 76 to effect a greater contact surface area to aid in moving the cam between locking and unlocking positions. Since the portion 72 extends inwardly within slot 46, and the same pivot pin 34 is used to pivot both the cam member and the brake lever member 66, both of these members will pivot together around the common pivot point and the effect is the same as if the elements were welded together.

In operation, the requirement is that suitable downwardly directed force be applied against the upper surface of the base portion 38 of the cam member 36 to effect disengagement or release of the brake shoe 48 from the periphery of the brake wheel 18. This force may be provided by the operator simply pressing down with his foot on the rear of member 36 to unlock the wheel within the horn. In order to effect engagement of the brake shoe against the periphery of the wheel, a downwardly directed force by the same means may be directed against the upper surface of the lever projection portion 74, preferably at the reverse curve portion 76 at which point the greatest lever action is provided. With such a simple apparatus, a relatively few elements effect frictional locking and releasing of the brake wheel within the caster horn and the necessity of the operator's bending over and using his hands or a hand operated instrument to effect release or engagement of the braking means is eliminated.

The present improved arrangement for moving a pivotal cam against a laterally moving brake shoe to effect frictional engagement with the periphery of a caster wheel while requiring only downwardly directed forces to achieve both engagement and disengagement may be advantageously used with such device for achieving effective braking of the caster wheel within the caster horn while at the same time preventing rotation of the caster horn with respect to its mounting pintle. In the embodiment shown in FIG. 9, there is provided a caster horn 10' including a flattened upper portion 12' which is adapted to support an anti-friction bearing assembly 80 between the horn 10' and the generally circular plate member 82, the circular plate member 82 being coupled rigidly with a pintle 84 allowing the caster horn 10 to rotate with respect to the pintle and plate member about a vertical axis. In like manner to the embodiment shown in FIGS. 1 and 2, the caster structure includes a wheel 18' mounted for rotation within horn 10' by means of axle 16'. A pair of identical brake cam bracket members 24' are rigidly coupled to the extreme rear side portions of caster horn 10' and extend rearwardly of the caster horn to support a cam member 36' which pivots around pivot pin 34'. An identical brake lever member 66' is coupled to the cam member 36' and pivots around the same pivot pin. The difference between the embodiment of FIG. 9 and that of FIGS. 1 and 2 is that the brake shoe 48' is so formed and positioned within the bracket members 24' that the scalloped portion 62' is adapted to contact the generally circular plate 82 at the outer periphery thereof, so as to achieve the dual braking function of preventing rotation of the caster horn 10' about a vertical axis with respect to the pintle 84 and plate 82 and preventing rotation of the caster wheel 18' within the horn 10'. In like manner to the other embodiments, a downwardly directed force against the base portion 38' of the cam member 36' will effect disengagement of the brake shoe member 48' with both the circular plate 82 and the periphery of wheel 18'. A downwardly directed force, upon the extension surface 74' of the lever 66', will effect frictional engagement and locking of the brake shoe against the circular plate member 82 and the periphery of wheel 18'.

The improved structure is comparatively simple and may be manufactured at relatively low cost. The device operates extremely satisfactorily in service, being adapted by convenient manipulation to exert very strong and effective braking pressure over as long a period as desired. It is important only that the brake shoe be of a character such that it will not take a permanent set as a result of the application of the brake. With the bow of the brake shoe being formed on a relatively large radius there is no deformation of the shoe as a result of use and while the bowing of the shoe may appear slight, it is ample for providing self release of the shoe for moving the shoe away from both the circular plate member and the periphery of the wheel in the embodiment shown in FIG. 9 and from the wheel member in the embodiment of FIG. 1.

While there have been described and illustrated fundamental novel features of the invention as applied to preferred embodiments, it will be understood that various omissions, substitutions, and changes in the form and details of the device illustrated and in its operation may be made by those skilled in the art without departing from the spirit of the invention. It is the intention, therefore, to be limited only as indicated by the scope of the following claims.

What is claimed is:

1. An improved frictional braking arrangement for a caster structure including; a caster horn having a caster wheel supported for rotation therein, a support projecting rearwardly from the upper part of said horn, a brake shoe mounted for movement in said support, toward and away from the wheel periphery, and having its extremities respectively engageable with a portion of said horn and the periphery of said wheel, said shoe being of resilient material, elongated in a vertical direction and bowed slightly with its concave face directed toward said caster wheel, a generally U-shaped cam member including a base portion and two generally parallel arms, cam surfaces formed on the free ends of said arms, a brake lever member, means for pivotally mounting said cam member and said lever member on said support with a common pivotal axis extending through said arms intermediate of said base and said cam surfaces, and means spaced from the pivotal axis interconnecting said cam member and said lever member for common rotation about said pivotal axis, said lever member including a portion extending forwardly past the pivotal axis, generally along the same plane defined by said cam arms, whereby said cam base and said portion of said lever member form upper contact surfaces for pivoting said cam to cause said caster wheel to be locked and unlocked.

2. Apparatus as claimed in claim 1 wherein said interconnecting means includes means defining an aperture formed within at least one of said cam arms, between said base portion and the pivotal axis, and said lever member comprises a generally longitudinally extending sheet metal strip including an outer terminal portion bent inwardly and adapted to fit within said aperture.

3. In a caster including caster horn structure having a caster wheel supported for rotation therein, an elongated brake shoe mounted in a generally vertical direction on the horn structure for movement toward and away from the wheel periphery and engageable therewith, an improved cam-operating structure for actuating the brake shoe comprising; a generally U-shaped brake cam including a base portion and two generally parallel spaced arms, said arms having cam surfaces formed on the free ends thereof engaging the side of the brake shoe remote of the caster wheel, means for pivotally mounting said cam on said horn structure to pivot about a generally horizontal pivotal axis, with the base portion of said cam directed rearwardly and the pivot axis extending through said arms intermediate of said base portion and said cam surfaces, said U-shaped cam further including a pair of aligned slots formed within said arms between said base portion and said pivot axis, and a pair of elongated brake lever members pivotally mounted on said horn structure at said pivot axis, and extending longitudinally of said cam arms, said elongated lever members including portions adapted to fit within said aligned slots whereby said longitudinally extending lever members rotate with said brake cam and are rigid therewith, said longitudinally extending lever members further including portions directed forwardly past said pivot axis whereby said forwardly directed portions and said base portion of said brake cam act as contact surfaces for alternately receiving downwardly directed forces for locking and unlocking said caster wheel.

4. Apparatus as claimed in claim 3 wherein said forwardly directed portions of said lever members are bent outwardly so as to hug closely the horn structure.

5. In a caster including caster horn structure having a caster wheel supported for rotation therein, and a generally elongated brake shoe mounted on the horn structure for movement toward and away from the wheel periphery and engageable therewith, the improvement which comprises: a generally U-shaped brake cam member having a base portion and two spaced, generally parallel arms, the free ends of said arms terminating in cam surfaces, means for pivotally mounting said cam member on said horn structure with said cam surfaces directed forwardly toward and engaging said brake shoe and with the pivot means extending through said arms intermediate of said base portion and said cam surfaces, a brake lever supported to pivot by said pivot means, means for rigidly coupling said brake lever to said generally U-shaped cam member, said brake lever including a forwardly directed portion extending a substantial distance past the pivot means, whereby said forwardly extending portion of said brake lever and the base portion of said U-shaped cam member act as pressure-responsive surfaces to move said cam member about said pivot means to selectively lock and unlock said caster wheel.

6. In a caster having a horn, a wheel rotatably supported by said horn, and a brake shoe supported by said horn and movable upon actuation into or from engagement with said wheel for braking or releasing the latter, the improvement being an actuating arrangement for the shoe, comprising an elongated cam member having a cam surface at one end thereof, an elongated brake lever, means pivoting said cam member and said brake lever to said horn for movement about a common pivot axis disposed between said cam surface and the other end of said cam member, said cam surface being adjacent said brake shoe and engageable therewith for actuation thereof, and means interlocking the cam member and the brake lever in general longitudinal alignment for common movement about said pivot axis, one end of the brake lever projecting in the direction away from the pivot axis past the cam surface, whereby the other end of the cam member and the one end of the brake lever are depressible for actuation of said brake shoe.

References Cited in the file of this patent

UNITED STATES PATENTS

| 1,733,536 | Guitschula | Oct. 29, 1929 |
| 1,785,421 | Nielsen | Dec. 16, 1930 |
| 2,484,094 | Jackson | Oct. 11, 1949 |
| 2,707,794 | Kramcsak | May 10, 1955 |